US006271608B1

(12) United States Patent
Haydock et al.

(10) Patent No.: US 6,271,608 B1
(45) Date of Patent: Aug. 7, 2001

(54) ALTERNATING CURRENT MACHINES

(75) Inventors: Lawerence Haydock, Peterborough; Peter John Wyles, Stamford; John Ernst Clive Bean, Bourne, all of (GB)

(73) Assignee: Newage International Limited, Stamford (GB)

( * ) Notice: Subject to any disclaimer, the term of this patent is extended or adjusted under 35 U.S.C. 154(b) by 0 days.

(21) Appl. No.: 09/147,056

(22) PCT Filed: Apr. 1, 1997

(86) PCT No.: PCT/GB97/00931
  § 371 Date: Sep. 28, 1998
  § 102(e) Date: Sep. 28, 1998

(87) PCT Pub. No.: WO97/37421
  PCT Pub. Date: Oct. 9, 1997

(30) Foreign Application Priority Data

| Mar. 29, 1996 | (GB) | .................................................. 9606679 |
| Feb. 10, 1997 | (GB) | .................................................. 9702666 |
| Mar. 20, 1997 | (GB) | .................................................. 9705649 |

(51) Int. Cl.[7] .......................... H02K 11/00; H02K 9/00; H02K 1/32; H02K 3/46
(52) U.S. Cl. ............................... 310/71; 310/62; 310/63; 310/65; 310/260
(58) Field of Search ............................ 310/71, 179, 260, 310/65, 59, 60 R, 62, 63, 270; 336/192, 197, 107; 439/109

(56) References Cited

U.S. PATENT DOCUMENTS

| 1,860,068 | * | 5/1932 | Bassler ............................. 310/60 R |
| 2,531,719 |   | 11/1950 | Alvino .............................. 318/296 |
| 2,874,317 | * | 2/1959 | Couse .................................. 310/71 |
| 3,746,817 |   | 7/1973 | Drown et al. ................... 200/168 K |
| 4,287,446 | * | 9/1981 | Lill et al. ............................. 310/71 |

(List continued on next page.)

FOREIGN PATENT DOCUMENTS

| 11 44 382 | 2/1963 | (DE) . |
| 14 88 025 | 8/1969 | (DE) . |
| 21 61 139 | 6/1973 | (DE) . |
| 25 26 532 | 12/1976 | (DE) . |

(List continued on next page.)

OTHER PUBLICATIONS

Research Disclosure, No. 342, Oct. 1992, p. 762, XP000326659 "Connection of Induction Motor Stator Neutral Wires to a Common Bus Ring With Copper ARC Spray/Plasma Spray Techniques".

International Search Report, Jul. 8, 1997.

* cited by examiner

*Primary Examiner*—Elvin Enad
*Assistant Examiner*—Dinh Le Dang
(74) *Attorney, Agent, or Firm*—Gary M. Gron

(57) ABSTRACT

An AC generator comprises a rotor 25 within a stator 24. The rotor carries a fan 27 at one end of the stator. The fan 27 is within a casing 30 which forms volume discharge passages 32. The fan 27 has blades 31 which project from the hub 28 at an angle which is oblique to the radial whereby those blades 31 trail the radial. The stator windings 23 form terminal leads 34 which are led from the end of the stator 24 remote from the fan 27. A circumferential array of cleats 35 which each have the form of a comb, support and guide the terminal leads 34 circumferentially, spaced from one another, to a certain location at the top from which the leads are taken and connected to terminals above. Those terminals are formed by the lower ends of busbars (56 to 58, 61 to 69) which extend through and which are supported by a structural panel of insulating material which forms an insulating barrier between the ends of those busbars. The upper end of each of those busbars forms the power output terminals U, V and W and the neutral terminals of the machine.

2 Claims, 13 Drawing Sheets

U.S. PATENT DOCUMENTS

Figure 1:
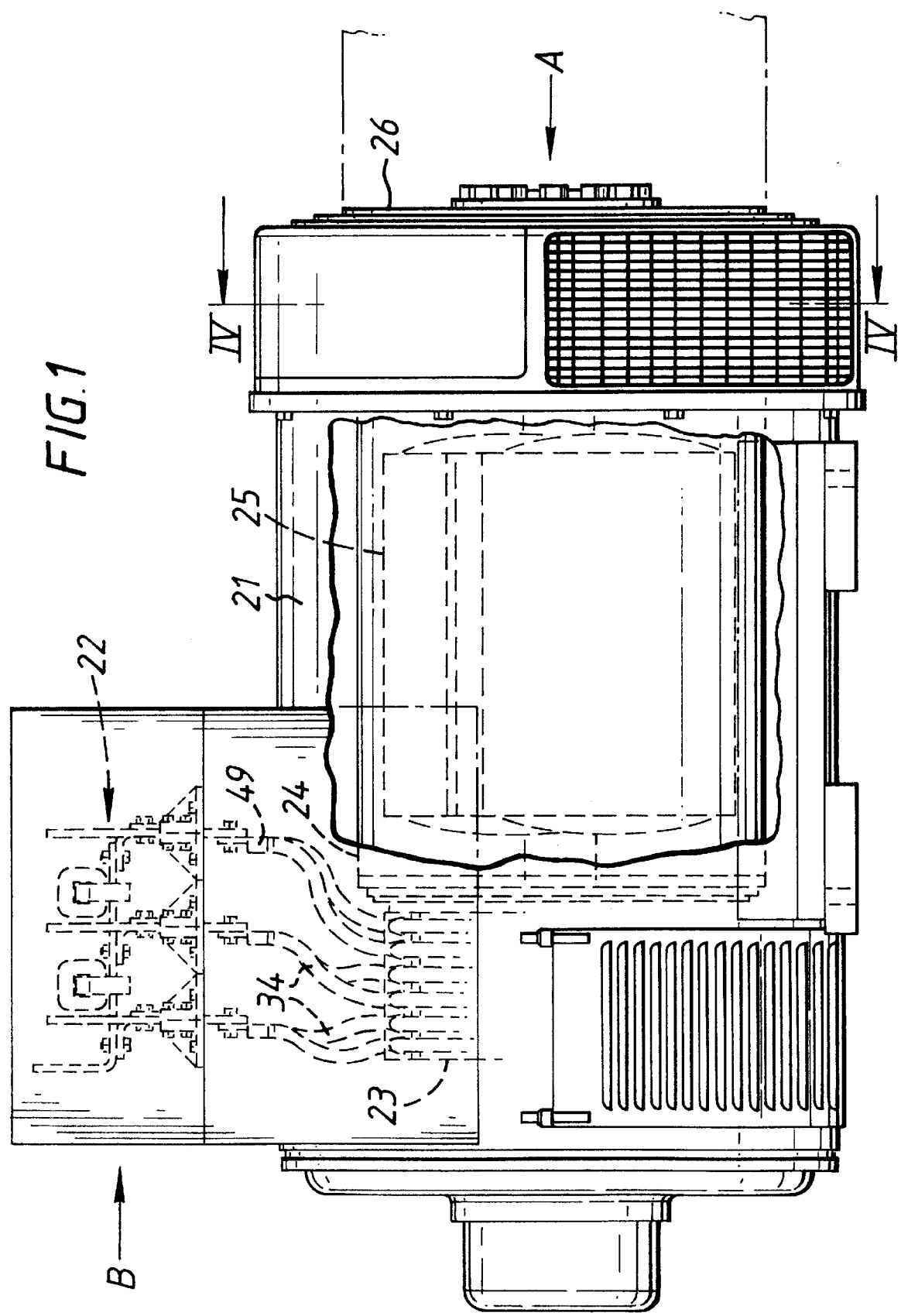

| | | | |
|---|---|---|---|
| 4,314,173 | | 2/1982 | Srdoch ................................ 310/260 |
| 4,544,856 | * | 10/1985 | King ..................................... 310/71 |
| 4,859,886 | * | 8/1989 | Tanaka et al. ........................ 310/51 |
| 5,063,314 | * | 11/1991 | DeSantis .............................. 310/71 |
| 5,175,458 | | 12/1992 | Lemmer ................................ 310/71 |
| 5,293,091 | * | 3/1994 | Edwards et al. ...................... 310/71 |
| 5,350,960 | * | 9/1994 | Kiri et al. ............................ 310/194 |
| 5,717,273 | * | 2/1998 | Gulbrandson et al. .............. 310/260 |
| 5,906,331 | * | 5/1999 | Ruoss ................................ 242/432.6 |

FOREIGN PATENT DOCUMENTS

| | | |
|---|---|---|
| 29 49 645 | 7/1980 | (DE) . |
| 0 643 465 | 3/1995 | (EP) . |
| 2 369 718 | 5/1978 | (FR) . |
| 2 551 588 | 3/1985 | (FR) . |
| 2 693 848 | 1/1994 | (FR) . |
| 59-144336 | 8/1984 | (JP) . |
| 1-283040 | 11/1989 | (JP) . |
| 7-231595 | 8/1995 | (JP) . |
| WO 95/29529 | 2/1995 | (WO) . |

ALTERNATING CURRENT MACHINES

This is a continuing application of International Application No. PCT/GB97/00931 filed on Apr. 1, 1997.

This invention relates to an alternating current machine and more particularly although not exclusively to an AC generator.

An alternating current machine comprises a rotor journalled for rotation within a stator comprising stator windings which are gathered together into an annular array at either end of the stator. The stator windings may be perfect lap windings or perfect concentric windings. Either way they comprise bundles of generally parallel conductors which are led from end to end of the stator and turned around at either end so as to be led back along the length of the stator. The bundles of conductors are led from end to end of the stator along generally parallel paths and form pairs of terminal leads at either end, the terminal leads being taken from one end of the stator to neutral and power output terminals of the machine to which they are connected.

If the terminal leads are bunched together as a solid mass, problems with hot spots arise. Also difficulties arise which cause the terminals to which terminal leads are connected to be located well spaced from the axis of rotation of the rotor. In practice there is no insulation between those terminals and the annular array of stator windings of the machine as is shown in DE-A-1144382.

U.S. Pat. No. 5,175,458 discloses an assembly for carrying stator terminal leads to a terminator to which an electrical connection can be made. The alternator for which this assembly is designed is relatively small. The assembly comprises an arcuate, or horseshoe-shaped member which is fitted to the appropriate end of the stator. The horseshoe-shaped member is solid and has three circumferentially extending channels defined in its outer surface. Each channel receives a terminal lead which is an extension of a stator winding and leads that terminal lead along the circumferentially extending track it forms to the terminator to which it is connected. The channels are axially spaced from one another. This arrangement would suffer from cooling problems if it were to be used in large alternating current machines because the terminal leads would be shielded from cooling air flow through the stator.

According to one aspect of this invention there is provided an alternating current machine as claimed in claim 1. Preferred features of that alternating current machine are claimed in claims 2.

DE-A-1144382 illustrates an arrangement of output terminals of an alternating current machine to which stator winding terminal leads may be connected. Each terminal to which such a terminal lead is connected is supported by a metal angle member to which it is riveted. The angle members are spaced from one another and are mounted at either end on a support fixed to the casing through a respective insulator. The electromagnetic forces that can be generated under fault conditions, such as sudden or sustained short circuit faults externally imposed on the machine by the power transmission or distribution system to which it may be connected, can cause the angle members to which the terminals are riveted to twist and in the extreme case, cause adjacent terminals to contact one another with undesirable consequences.

FR-A-2693848 disclose a mounting for distribution busbars in which the busbars are clamped between elongate mouldings which fill spaces between faces of adjacent busbars. The mouldings have a uniform cross-section with flat sides which are in face to face abutment with the faces of the busbars. Gaps remain between the edges of adjacent busbars and adjacent mouldings since the mouldings are spaced from one another by the thickness of the busbars. The stack of mouldings and busbars is clamped by nuts fitted to the ends of screws which extend through the gaps and through aligned holes in the mouldings.

It is desirable to arrange the busbars of the terminal arrangement of a three phase machine so that the leads can be connected to their positions below the structural panel permanently and adjustment between a series star connection and parallel star connection can be made from above the structural panel without altering the connection of the leads below. This is achieved by providing for each of the three power output busbars and the respective neutral busbars, a respective pair of spaced busbars which extend through the structural panel in substantially the same way as the neutral and power output busbars between which they are located. Each such respective pair of spaced busbars are connected together by a suitable link above the structural panel for a series star connection. On the other hand, one busbar of each such respective pair is connected to the adjacent neutral busbar and the other busbar of the respective pair is connected to the adjacent power output busbar for a parallel star connection, such connections between the busbars being made by suitable links above the structural panel.

The rotor of an alternating current machine may carry a fan at the end of the stator remote from the terminal leads. The fan would be operable to draw air through the stator from the remote end thereof in order to cool the stator windings.

DE-A2526532 discloses such a rotor and fan arrangement. The fan is within a casing which cooperates with it to provide a conduit for discharge of air flow from the fan, the conduit being in the form of a volute whereby its area increases progressively in the downstream direction. Although such use of a volute casing improves the cooling by increasing the volume of air that is drawn through the stator by the fan for discharge through the discharge passage formed by the volute casing, even more cooling is desirable.

Figure 2:
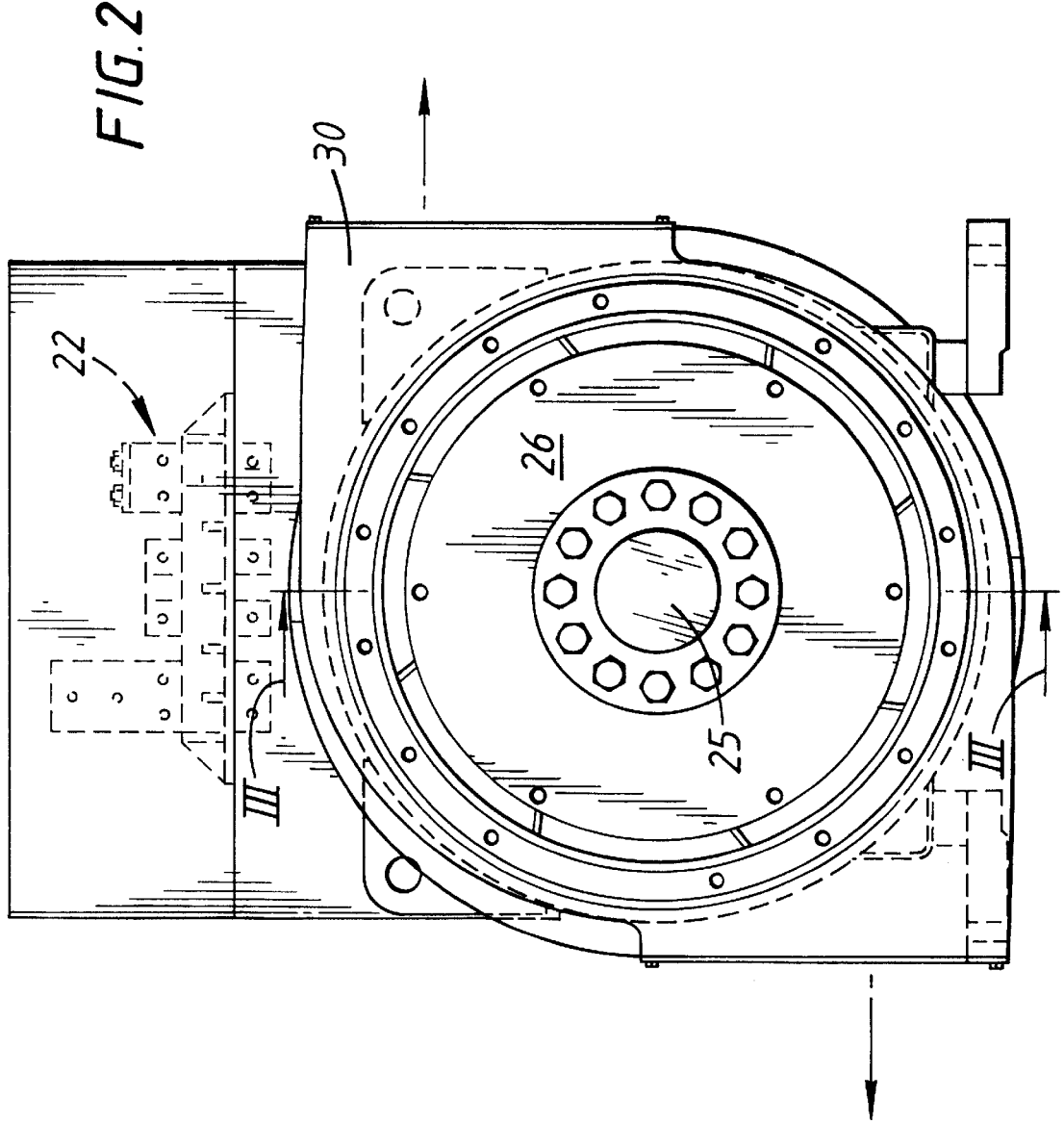
Figure 3:
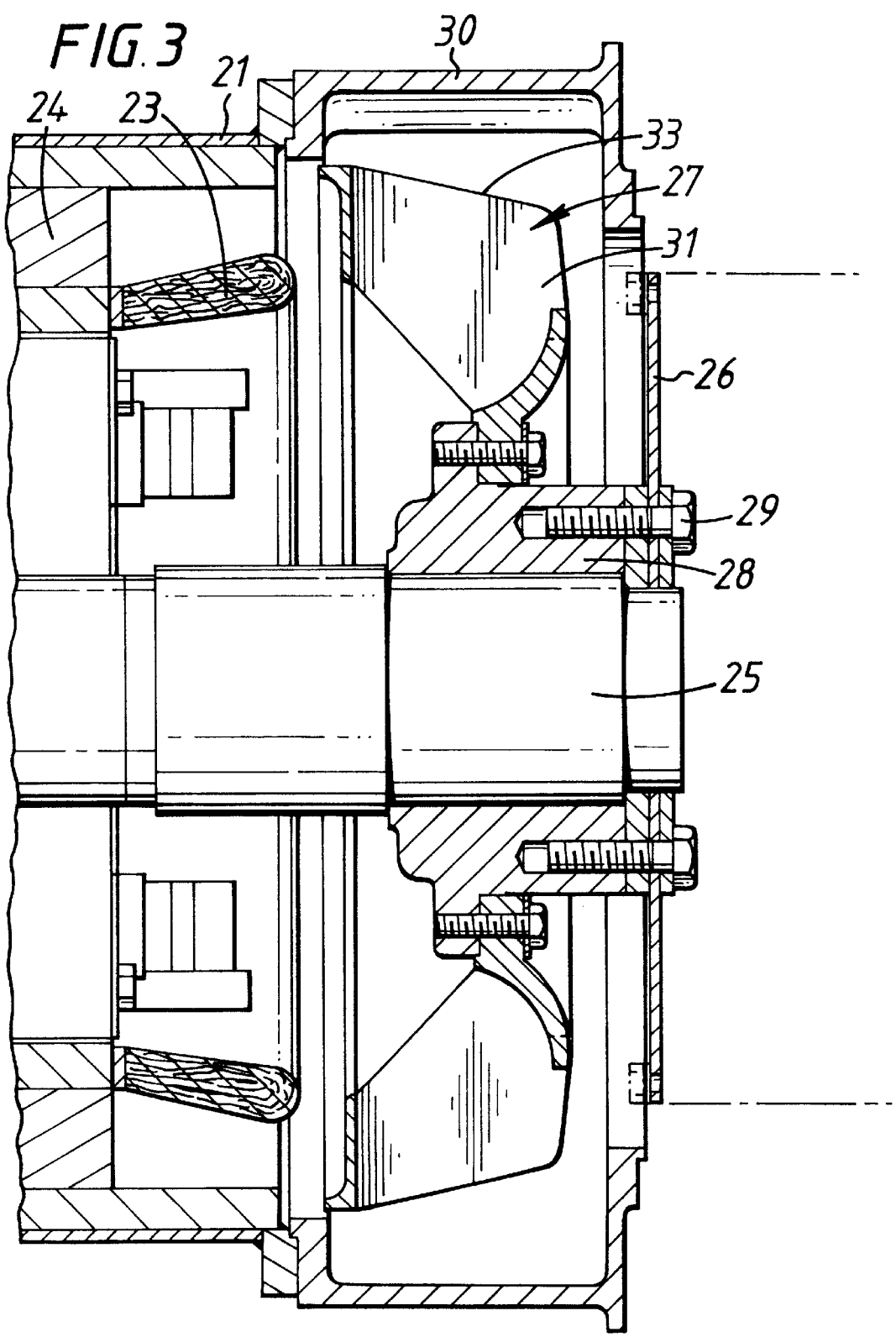
Figure 4:
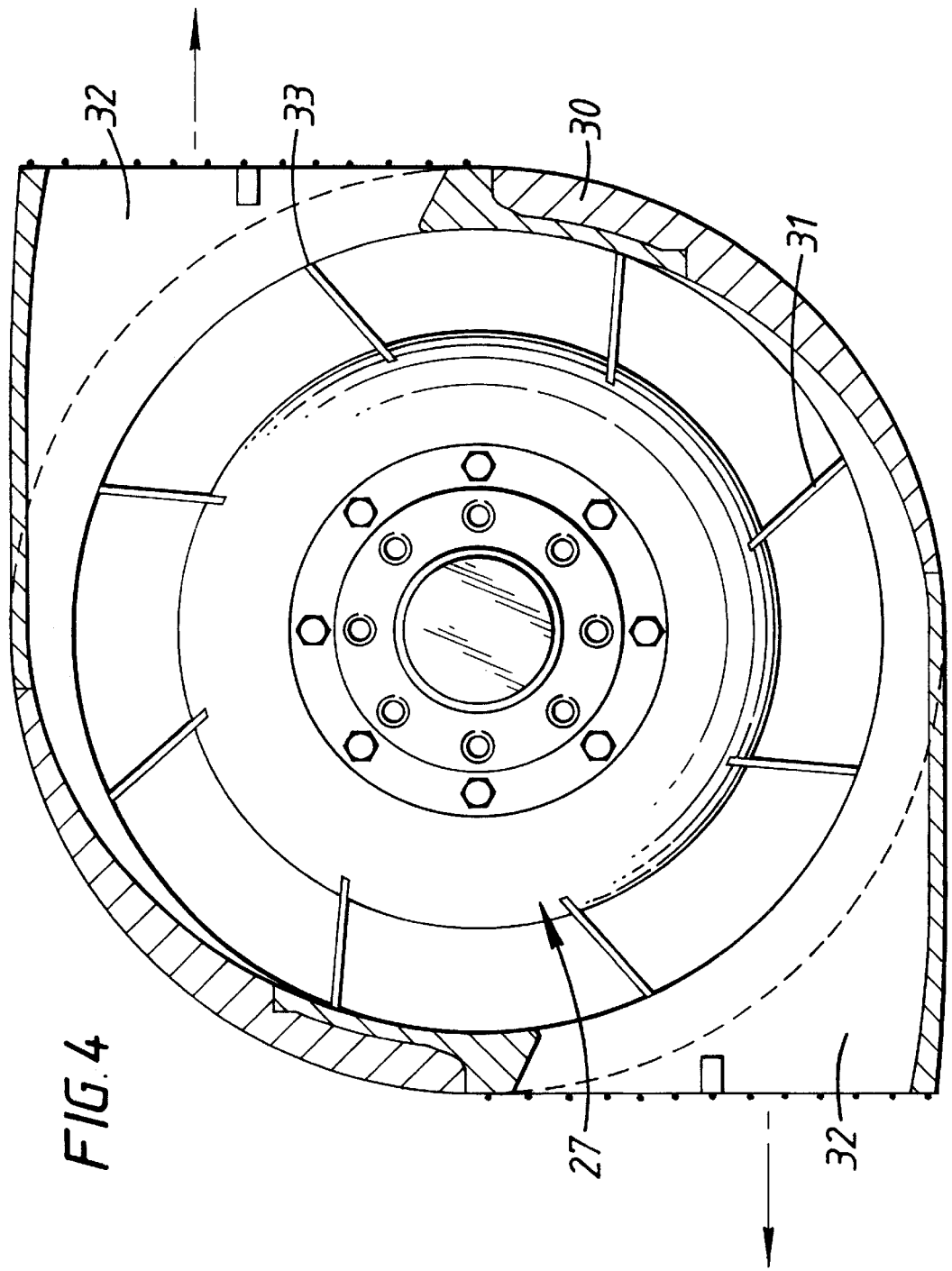
Figure 5:
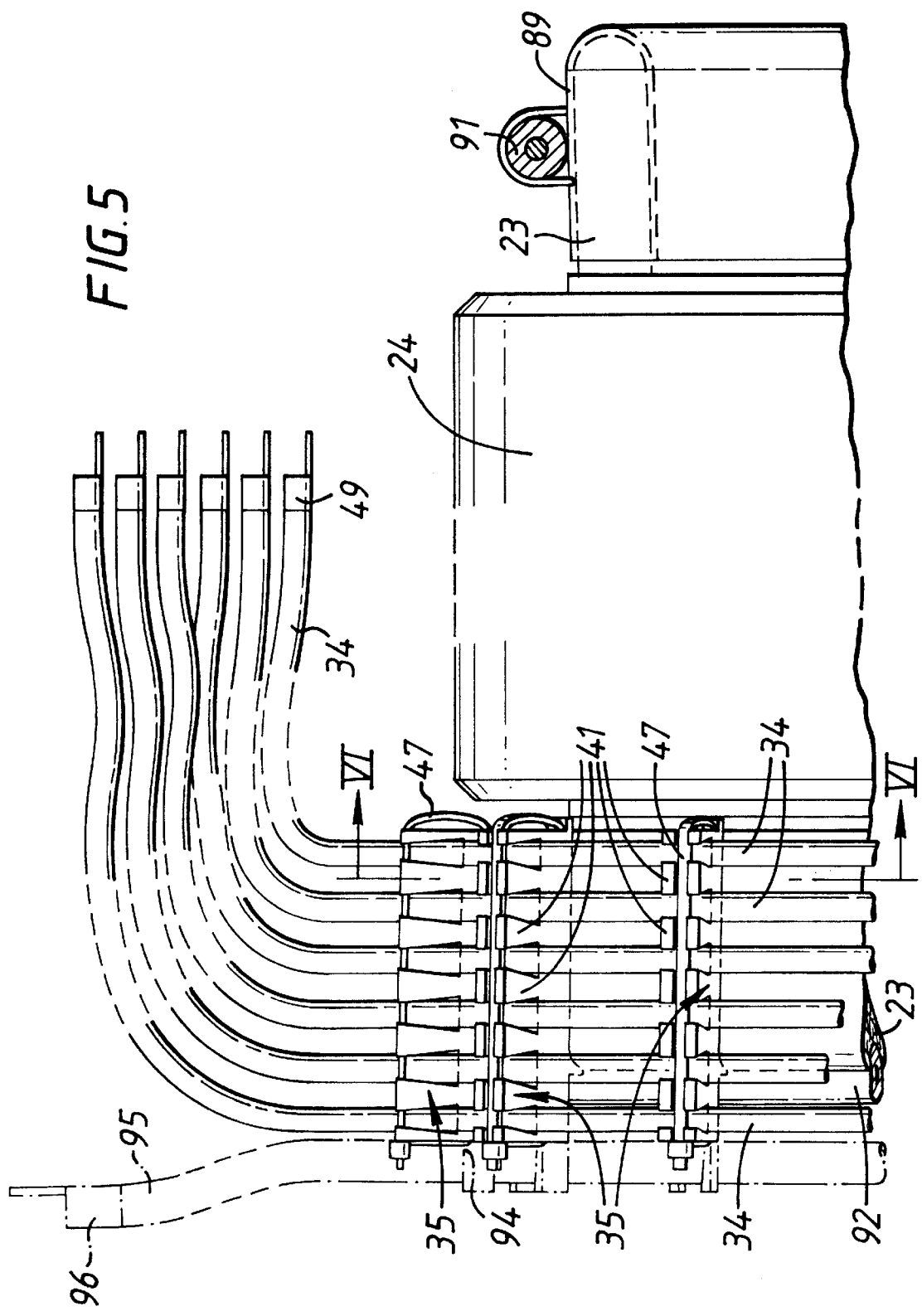
Figure 6:
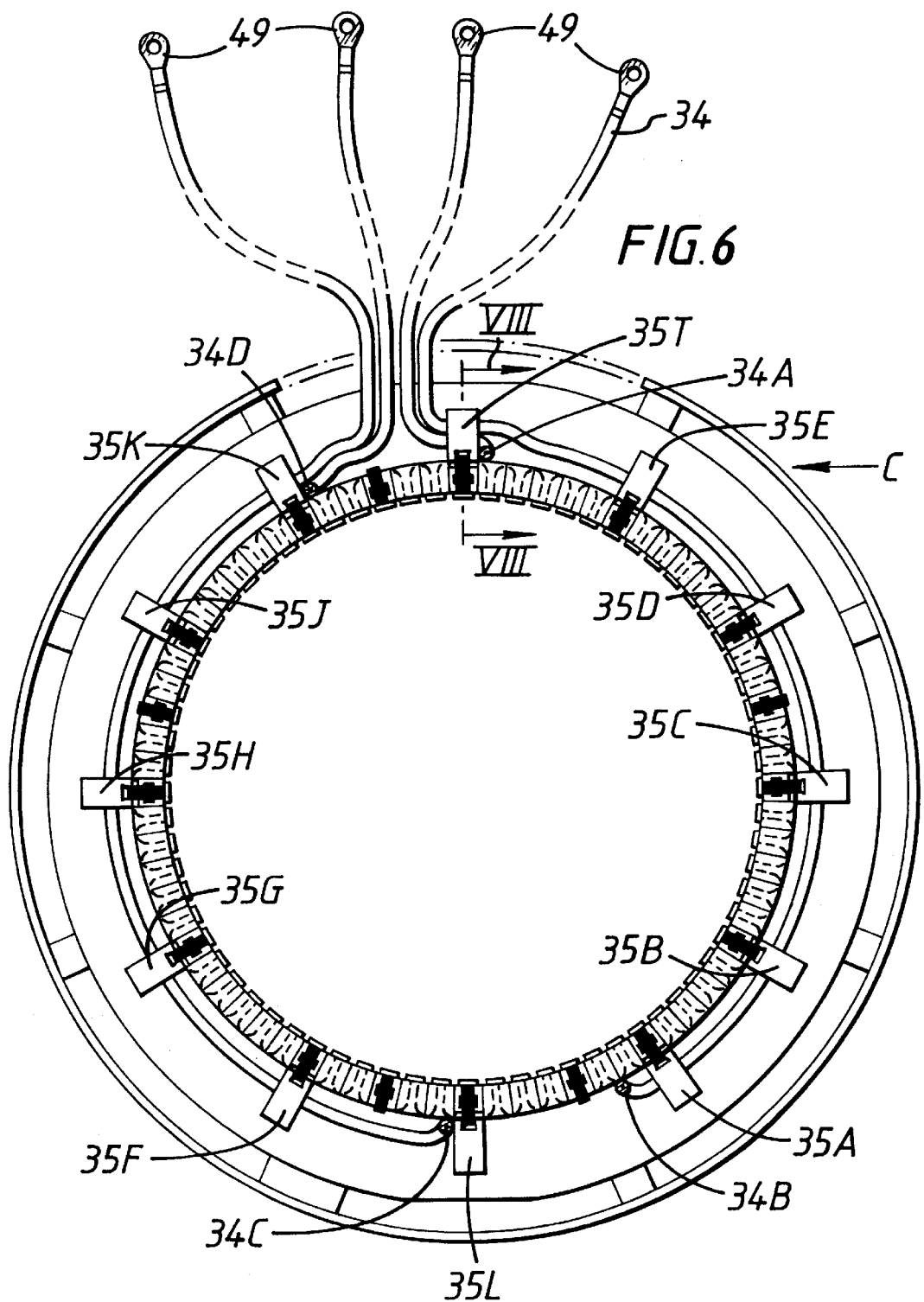
Figure 7:
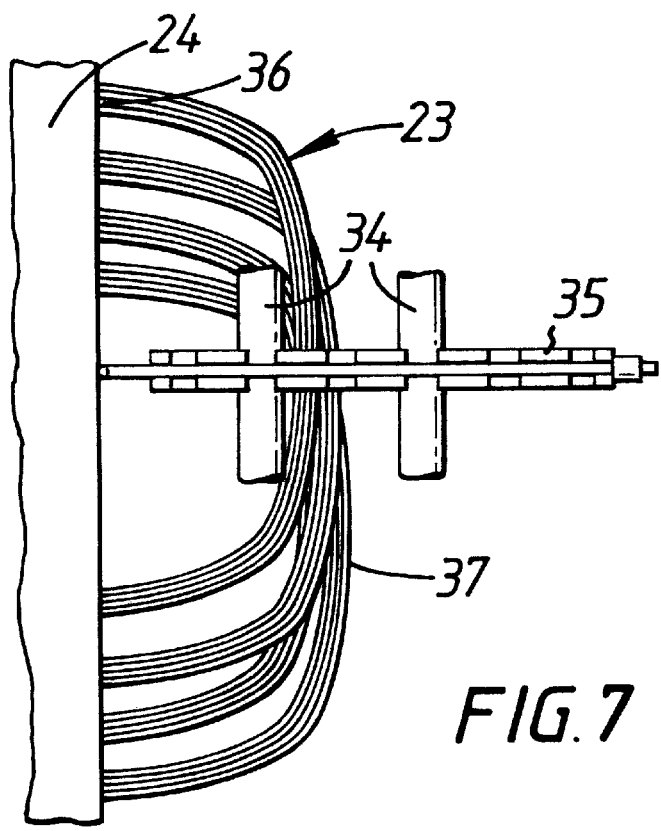
Figure 8:
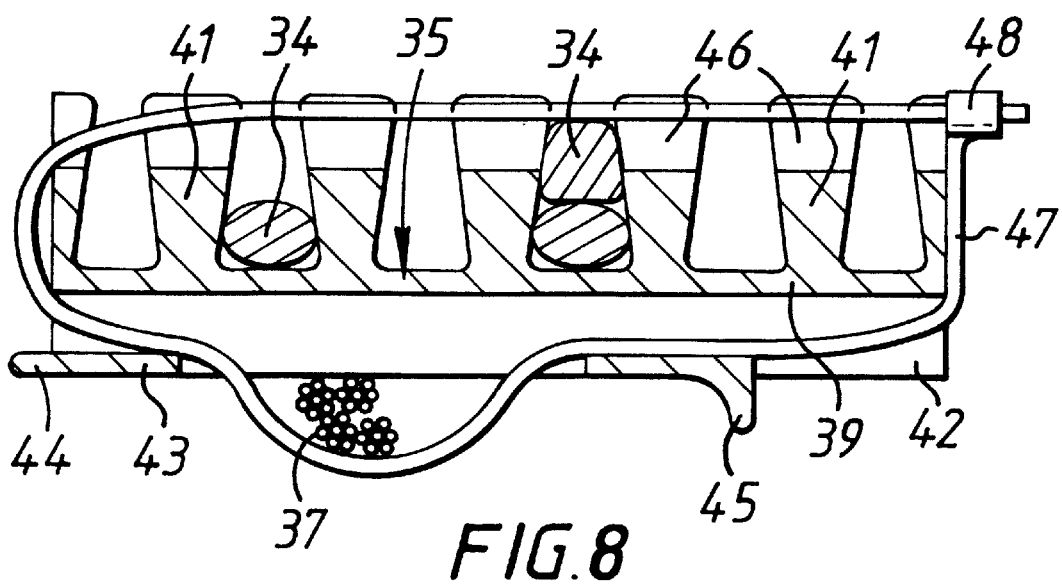
Figure 9:
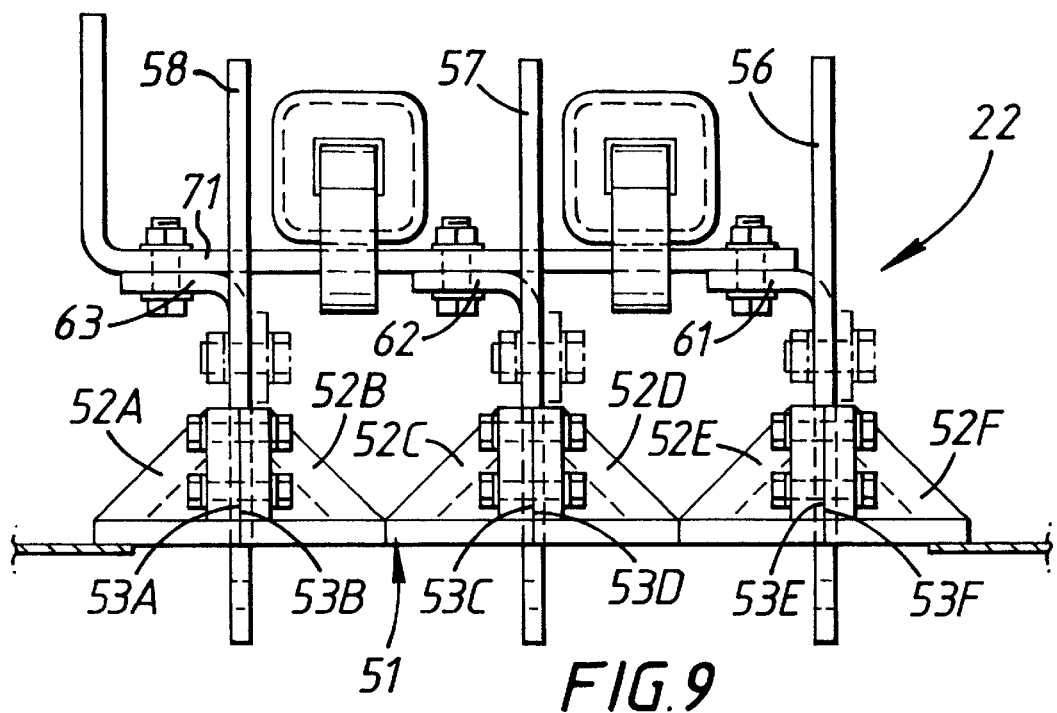
Figure 10:
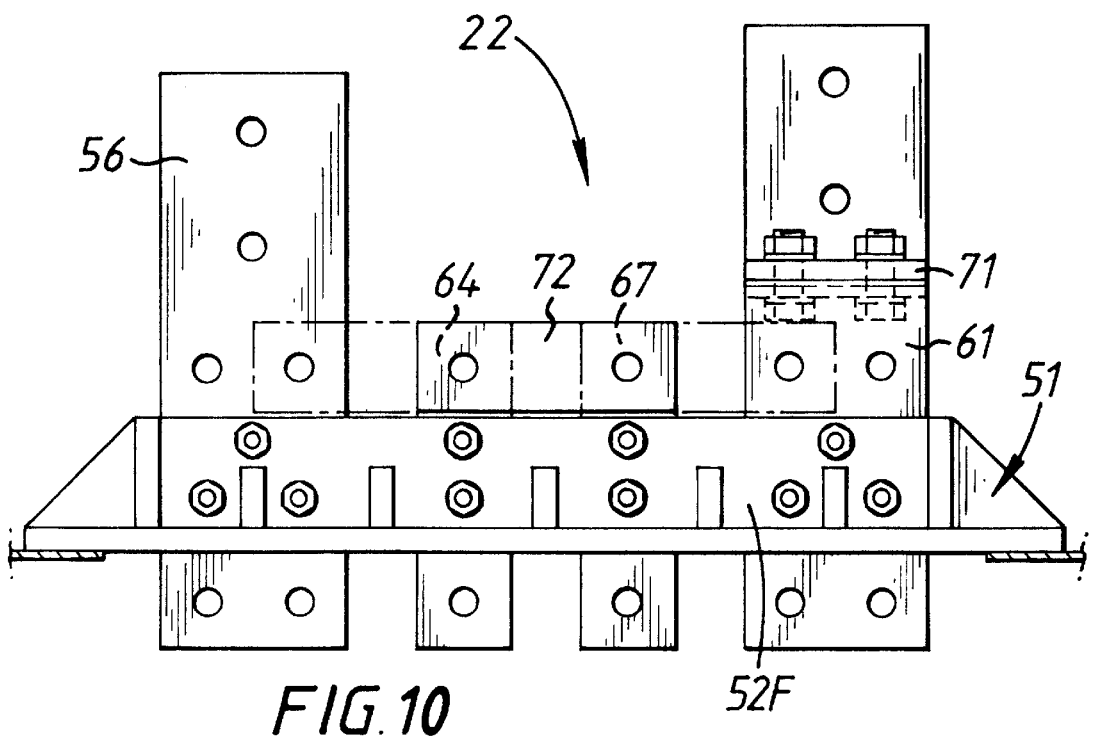
Figure 11:
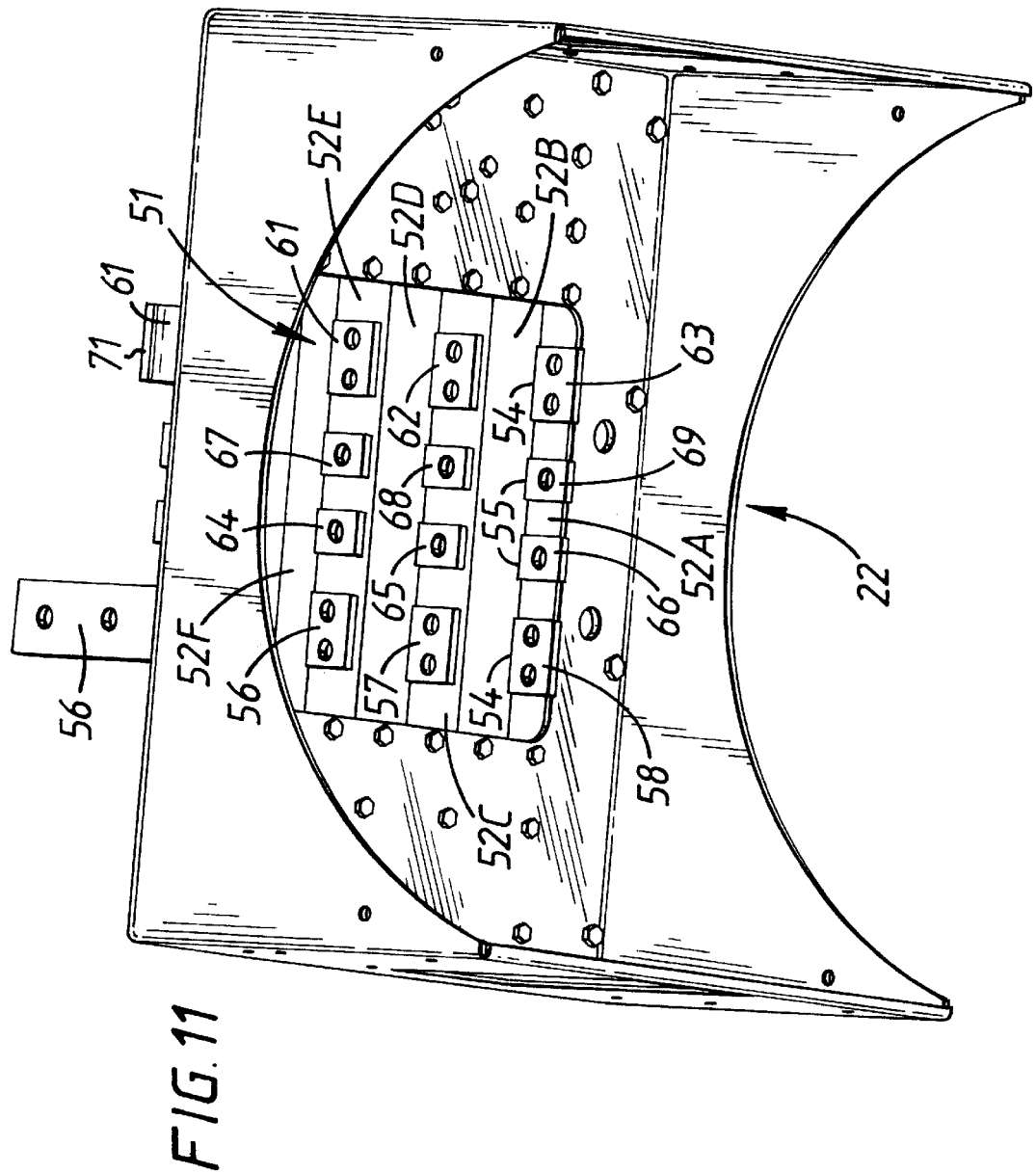
Figure 12:
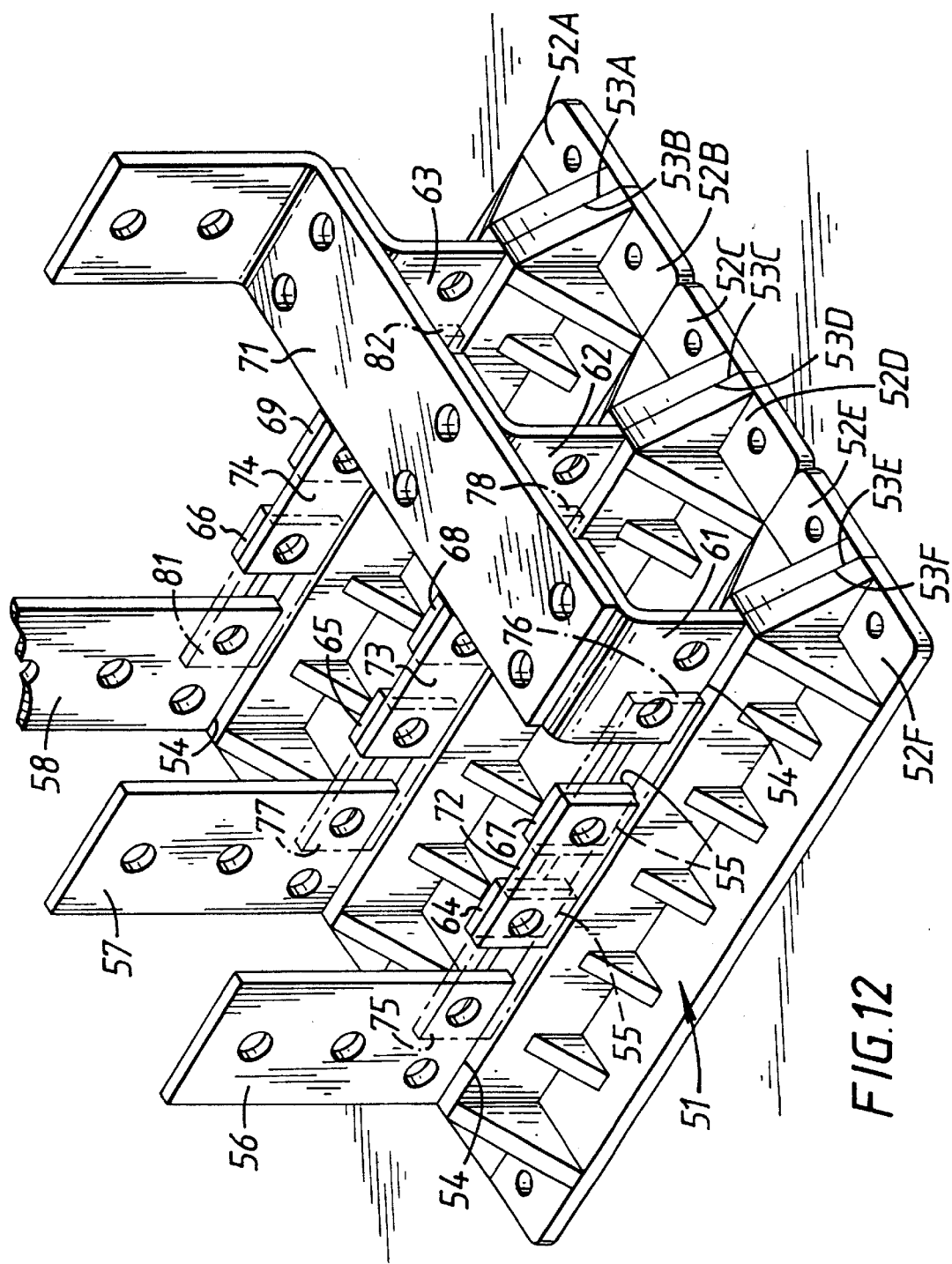
Figure 13:
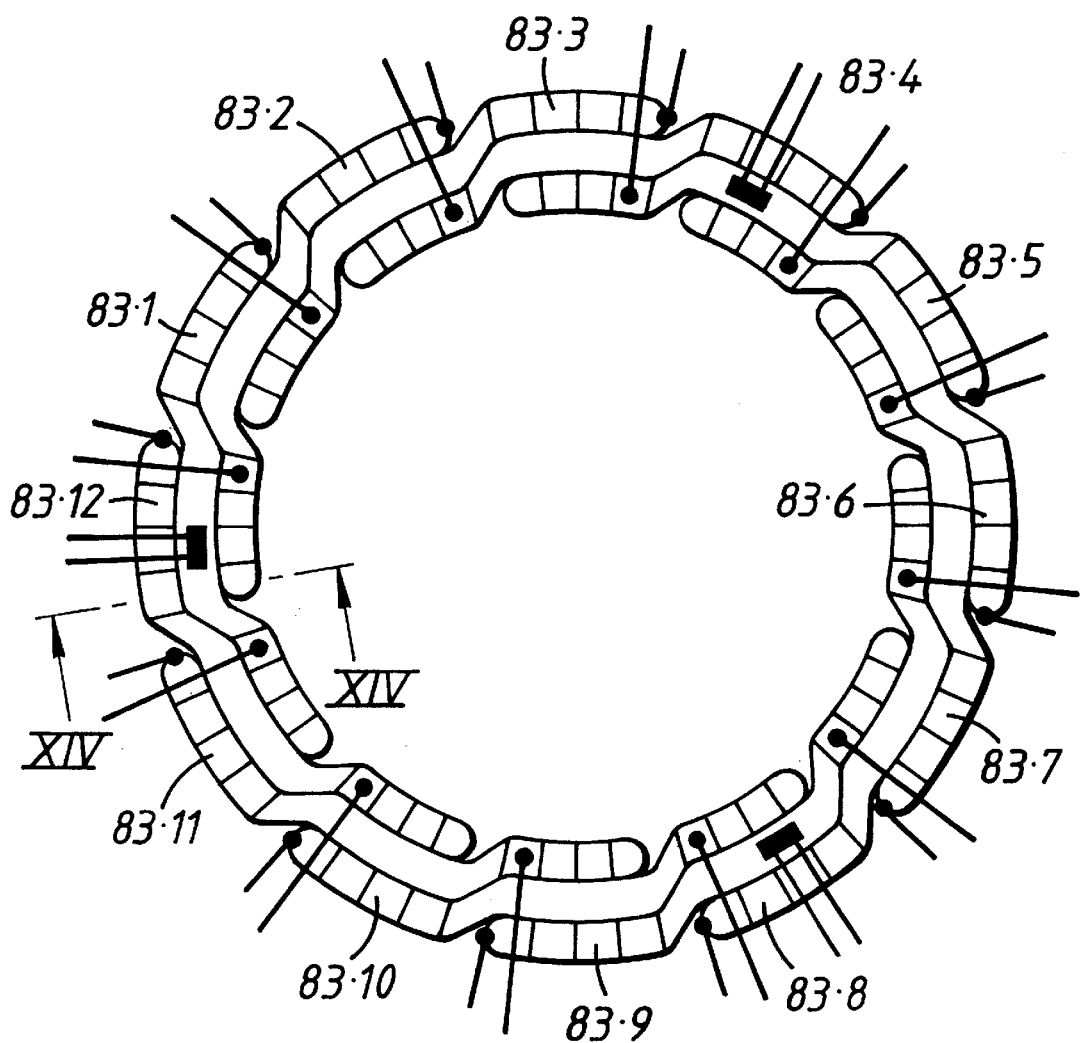
Figure 14:
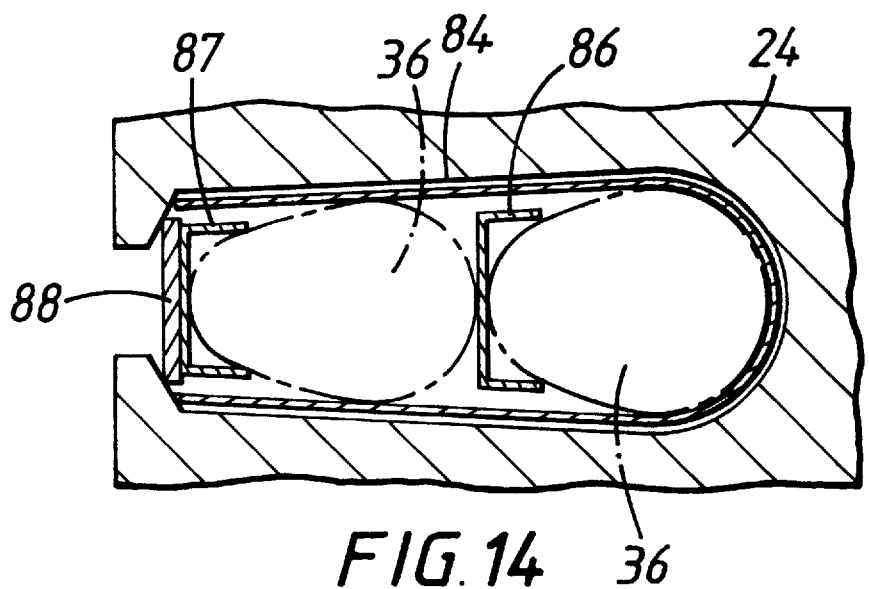
Figure 16:
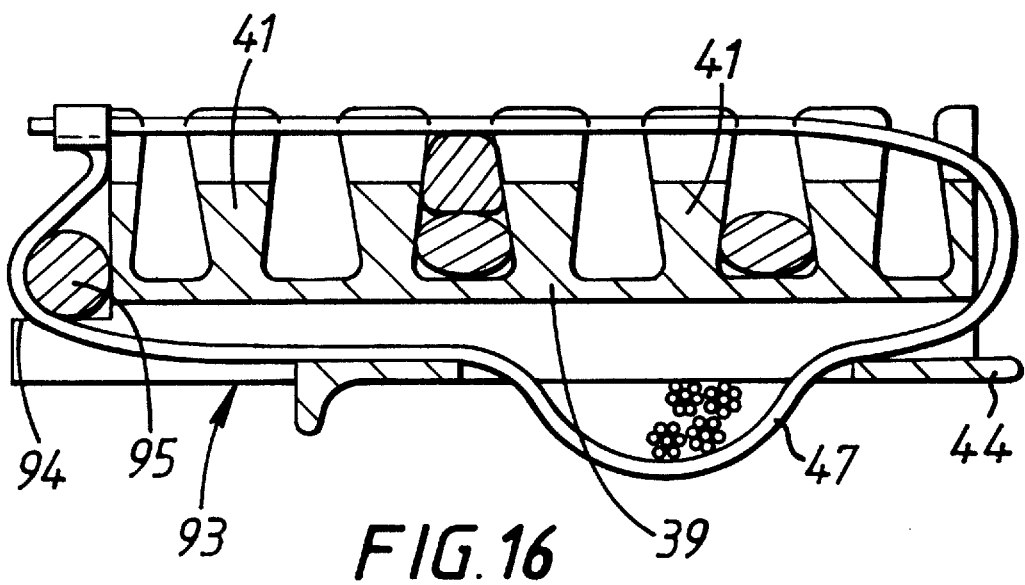
Figure 15:
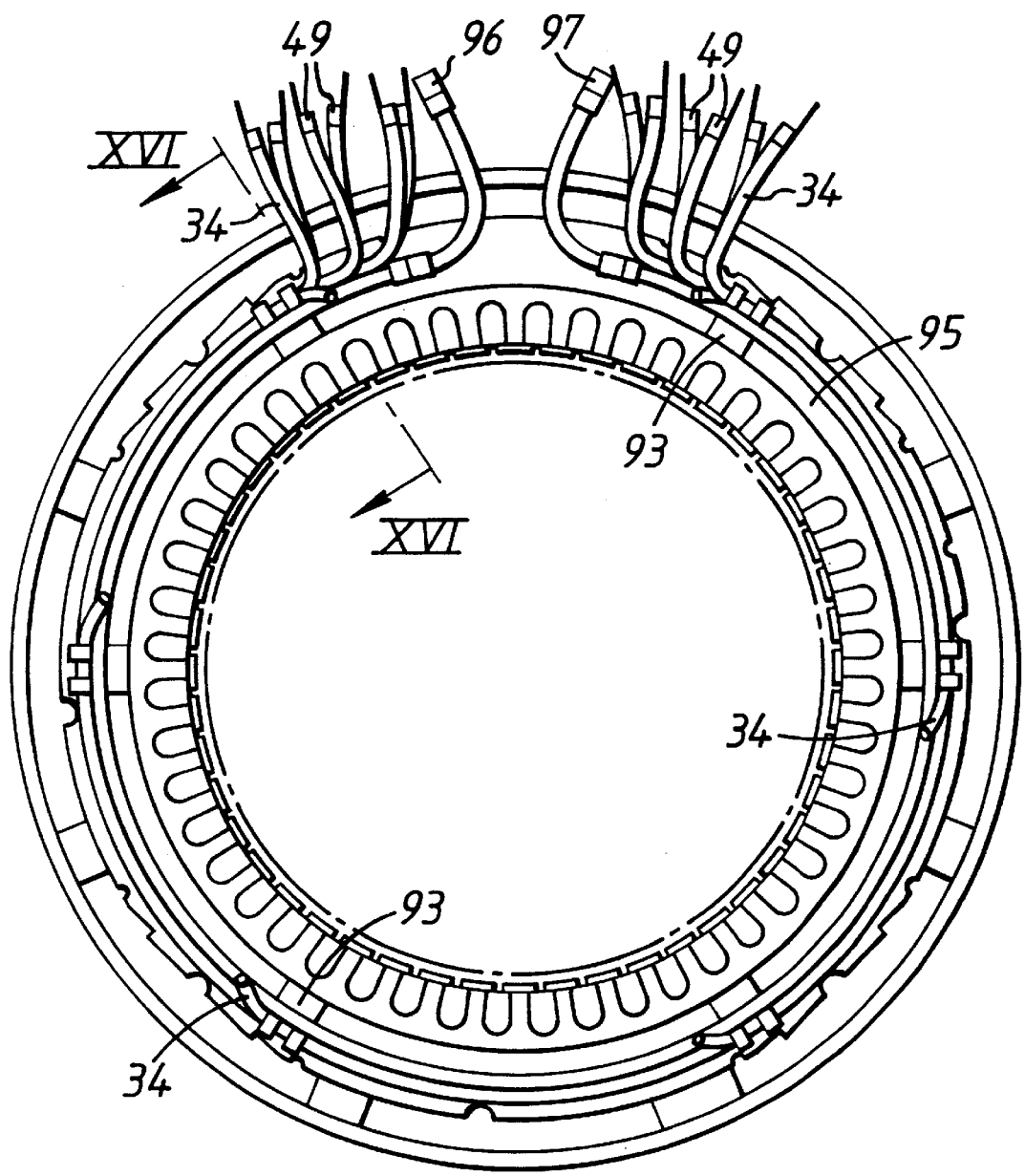

A three phase AC generator which embodies this invention and certain modifications thereof will be described now by way of example with reference to the accompanying drawings, of which:

FIG. 1. is a side elevation of the AC generator with part of the casing cut away;

FIG. 2. is an end elevation of the AC generator as seen in the direction of arrow A in FIG. 1;

FIG. 3. is a sectioned view of the right hand end part of the AC generator as shown in FIG. 1 which includes a fan, the section being on the line III—III in FIG. 2;

FIG. 4. is a section on the line IV—IV of FIG. 1 showing the fan within its casing;

FIG. 5. is a side elevation drawn to a larger scale than is shown in FIG. 1, of the upper part of the stator of the AC generator shown in FIG. 1 and as seen in the direction of arrow C in FIG. 6, with the windings that emerge from it at either end and the arrangement of output leads at the left hand end, a modification of the latter being shown chain dotted;

FIG. 6. is a partly sectioned end elevation of the stator shown in FIG. 5 to a larger scale, the section being on the line VI—VI in FIG. 5;

FIG. 7. is a fragmentary view showing one of the circumferential array of cleats shown in FIGS. 5 and 6, mounted on a group of lap windings at the left hand end of the stator as shown in FIG. 5;

FIG. 8. is a section on the line VIII—VIII in FIG. 6, to a larger scale than in FIGS. 5 and 6;

FIG. 9. is a view in elevation of the terminal block as shown dotted in FIG. 1, to a larger scale and in more detail;

FIG. 10. is a side view of the terminal block shown in FIG. 9 as seen along arrow B in FIG. 1;

FIG. 11. is a view in perspective from the underside of the terminal block of the AC generator as shown in FIGS. 1, 9 and 10;

FIG. 12. is a perspective view from above of the terminal block shown in FIG. 11;

FIG. 13. is a diagrammatic cross section of stator windings arranged in a "perfect" concentric configuration;

FIG. 14. is a section on the line XIV—XIV in FIG. 13 of windings in a longitudinally extending groove in the inner surface of the stator; and FIGS. 15 and 16 are views similar to FIGS. 6 and 8 respectively of the modified form of the AC generator shown in FIGS. 1 to 24 which is illustrated in chain dotted lines in FIG. 5, FIG. 16 being a section on the line XVI—XVI in FIG. 15.

FIGS. 1 and 2 show an AC generator which comprises a casing 21. At the left hand of the casing 21, as seen in FIG. 1, there is an output terminal block 22 by which a three phase alternating current generated by the AC generator is collected from armature windings 23 (see FIG. 1) on a stator 24 which is housed within the casing 21. A rotor 25 is journalled in the stator 24. The rotor 25 carries a coupling plate 26 at its right hand end, as seen in FIG. 1. The coupling plate 26 is for coupling to a fly-wheel of a prime mover or engine whereby the rotor 25 is driven.

FIG. 3 shows the right hand end of the rotor 25 projecting from the right hand end of the stator 24. A radial flow fan 27 is bolted onto a hub 28 which is force fitted onto the end of the rotor 25 adjacent the coupling plate 26 which is fixed to it by set screws 29. The fan 27 may be forced fitted directly onto the rotor 25 instead.

FIGS. 3 and 4 show the fan 27 is surrounded by a volute casing 30 which is bolted to the end of the casing 21. The volute casing 30 is formed so that two diametrically opposed portions of it diverge in the downstream direction form the path traced by the tips of the blades 31 of the fan 27. Hence two diametrically opposed passages 32 for the discharge of air from the fan 27 are formed between the fan 27 and the volute casing 20, the cross-sectional area of each of these discharge passages 32 increasing progressively in the discharge direction.

Each blade 31 projects from the hub 28 at an angle which is oblique to the notional radius that passes through the root of that blade 31, each blade 31 diverging from its respective notional radius in a direction which is upstream with respect to air flow generated by the fan 27. The tip 33 of each blade 31 is tapered so that it converges with the axis of rotation, the angle of taper being of the order of 12.5 degrees and the taper being towards the coupling plate 26.

FIG. 5 shows the stator 24 with the casing 21 and the rotor 25 removed. The stator windings 23 may be either perfect lap windings or perfect concentric windings as will be understood by a man skilled in the art.

The conductors that form the stator windings 23 are extended outwards from the left hand end of the stator 24, as seen in FIGS. 5, to form leads 34 by which the stator windings 23 are connected to the terminal block 22. Each lead 34 and the respective stator winding 23 to which it is connected is a one piece conductor without any electrical connection joining them together. The leads 34 project from the stator 24 initially as an axially extending circumferentially spaced array. There are twelve pairs of such leads 34, each pair being extensions of the opposite ends of a respective one of the stator windings 23 and being angularly spaced from one another by about 155°.

A circumferential array of cleats 35 project from the end of the stator core on which they are mounted. FIG. 6 shows that one of the cleats 35 is located at the top of the stator 24 and the others are equally spaced at angular intervals of about 30°.

FIG. 7 shows an exemplary group of stator windings 23 at the end of the stator 24 from which the power output leads 34 are led to the output terminal block 22. Each winding 23 comprises a bunch of generally parallel wire conductors 36 which are led along generally parallel paths which run the length of the stator 24 from end to end and which are turned around at either end, so that a bunch of wire conductors 36 which emerges from one axially extending path in the stator 24 at one end of the stator 24 is turned around to re-enter a parallel axially extending path in the stator 24. These windings 23 are a perfect lap winding arrangement so that each curved winding portion 17 by which the wire conductors 36 are so turned around overlap several of the adjacent curved winding portions 37 that are spaced from it in one circumferential direction around the stator 24, those being the other winding portions 37 that emerge from the stator 24 between its point of emergence from the stator 24 and its point of re-entry to the stator 52. Also, there are two bunches of conductors 36 laid one on the other in each parallel path in the stator 24. All the reentrant conductors 36 are laid over the other bunch of conductors 36 that they overlap, in the respective path. Each of these windings 23 has two ends which are extended outwards from the stator 24 to form the power output leads 34 by which the stator windings 23 are connected to the terminal block 22.

Each cleat 35 is a moulding of an electrically insulating plastics material such as nylon. FIG. 8 shows that each cleat 35 comprises an elongate back portion 39 from which seven prongs 41 project laterally so that it has the form of a comb. Each cleat 35 is mounted on the stator core with its back portion 39 extending axially with respect to the stator 24 and with the prongs 41 projecting radially outwardly. The prongs 41 are shaped so that the nearer sides of juxtaposed prongs 41 converge. Hence each of the intervening spaces of each cleat 35 is thereby adapted to receive a lead 34 which is fitted into it with a snap action through its narrow mouth and which is retained in it by the prongs 37. Two spaced walls 42 project from the back portion 39 in the opposite direction to that in which the prongs 41 project, each side wall 42 extending from a respective one of the two longitudinally extending edges of the back portion 39. The spacing between the two side walls 42 is bridged at one end of the cleat 35 by a flat plate-like element 43 at the ends of the side walls 42 remote from the back portion 39, the plate-like element 43 projecting from the end of the side walls 42 to form a projecting tongue 44. The space between the side walls 42 is also bridged by another short plate-like portion 45 at a location which is about three-quarters of the length of the cleat 35 from the plate-like element 43. The thickness of the plate-like portion 45 increases progressively in the direction away from the plate-like element 43, flaring outwardly from the back portion 39 to the end which is remote from the plate-like element 43.

The outer end of each prong 41 has a rectangular recess 46 formed in it substantially centrally. The recesses 46 in each prong 41 are aligned. Each cleat 35 is provided with a respective strap 47 by which it is fastened to the adjacent group of curved stator winding portions 37. The strap 47 has a rectangular cross-section and is provided at one end with a ring portion 48 which serves as a retaining socket, the aperture of the socket having a similar form, it being for receiving the other end of the strap 47. One of the sides of the strap 47 is provided with formations which engage in a corresponding formation in the inner periphery of the ring portion 48 whereby the length of strap 47 threaded through the aperture of the ring portion 48 is retained therein against being pulled back.

The strap 47 is laid in the recesses 46 at the ends of the prongs 41 so that it projects from either end of the cleat 35, the ring portion 48 being to the left as seen in FIG. 8. The ring portion 48 is threaded into the channel between the side walls 42 and through the gap between the back portion 39 and the plate-like element 43. From there it is drawn through the gap between the plate-like element 43 and the plate-like portion 45 and passed around the plate-like portion 45 to the other end of the cleat 35 where it is fitted over the other end of the strap 47 which protrudes from the cleat 35 so as to complete a loop formed by the strap 47 which surrounds the cleat 35.

The flared plate-like portion 45 rests upon the adjacent curved stator winding portion 37 and the tongue 44 locates against the end of the stator 24. The curved winding portions 37 that are below the cleat 35 are encircled by the strap 47 so that they are trapped between the strap 47 and the lower edges of the side walls 42 of the cleat 35 whereby the cleat 35 is fastened to them.

The length of the strap 47 which is laid within the recesses 46 in the prongs 41 serves to brace leads 34 within the respective intervening spaces between juxtaposed prongs 41 through which they are led from the stator windings 23 to the terminal block 22 to resist electromagnetic forces, which would otherwise tend to displace them, especially under fault conditions, such as sudden or sustained short circuit faults, externally imposed on the alternator by the power transmission or distribution system to which it may be connected. The prongs also serve as spacers which space juxtaposed terminal leads 34 apart and react electromagnetic forces which act to urge towards them the leads 34 that they separate.

The strap 47 is a moulding of electrically insulating plastics material such as nylon.

The six radially outwardly tapered spaced formed between the prongs 41 of each of the cleats 35 are arranged as a circumferentially spaced series and thereby define six juxtaposed circumferential tracks for the leads 34 by which those leads 34 are guided from the stator 24 to a location to one side of and above the stator 24 at which they terminate as an array of twenty four upwardly projecting terminals 49. This can be seen in FIGS. 1, 5 and 6. FIGS. 1 and 5 show that the leads 34 are spaced from one another in the direction of the axis of the stator 24 as they are led side by side around the six circumferentially extending tracks formed by the cleats 35. The circumferential array of cleats 35 and the leads 34 they guide around the circular path together form a grid structure so that those leads 34 are supported in free space by the cleats 35. Also the interstices of that grid structure serve as ventilation spaces through which air can be drawn past the leads 34 so that the latter are cooled. The linking together of the circumferential array of cleats 35 by the leads 34 into the grid structure provides additional strength to resist the effect of electromagnetic forces which, as previously described, would tend to displace the leads 34 and the protruding windings 23 under fault conditions, and thus augments the resistance to such electromagnetic forces provided by the straps 47 of each individual cleat 35 of the array.

FIG. 6 shows the arrangement of the four leads 34A and B and 34C and D that are led around an exemplary one of the circumferentially extending tracks, that being the track that is formed by those spaces of the cleats 35 that are nearest to the stator 24. The lead 34A extends axially from the stator 24 at a location which is spaced angularly from the top of the stator 24 by a few so that it is just to the right of the cleat 35T at the top, as seen in FIG. 6. From there it is bent towards and snap-fitted into that cleat 35T from which it is bent upwards to its terminal 49. The lead 34B, which is the other of the respective pair of leads 34 that are extensions of the opposite ends of a respective one of the stator windings 23, extends axially from the stator 24 at a location which is spaced angularly from the bottom of the stator 24 by about 25°. It is bent towards and snap-fitted into the respective space in the cleat 35A that is spaced from the bottom of the stator 24 by 30° and to the right as seen in FIG. 6. The lead 34B is then snap-fitted into the respective space in each of the other four cleats 35B–35E on the same side of the stator 24 and finally it is snap-filled into the cleat 35T above the lead 34A as can be seen from FIG. 6. The lead 34B is then bent upwards to its terminal 49 alongside the lead 34A.

The lead 34C emerges axially just to the left of the bottom cleat 35L. This is bent towards and snap-fitted into the respective space in the cleat 35F that is spaced from the bottom of the stator 24 by 25° and to the left as seen in FIG. 6. It is then snap-fitted into the corresponding space in each of the other four cleats 35G to 35K on the same side of the stator 24. The other lead 34D of the respective pair emerges axially from the stator 24 just to the right of the cleat 35K. The two leads 34C and 34D are then bent together upwards to their respective terminals 49 alongside the pair of leads 34A and 34B.

It will be understood that each of the six tracks leads a respective group of two pairs of leads 34 so that they extend upwardly to their terminals 49 in a manner similar to that described above with reference to FIG. 6.

Cleats having only four spaces instead of the six described and illustrated for the cleats 35 are used in single phase AC generators of otherwise similar design.

FIGS. 9 and 10 show that the terminal block 22 comprises a structural panel 51. This panel 51 is formed of six smaller elongate angle members 52A to 52F which are arranged in three juxtaposed pairs. The upright faces 53A and 53B, 53C and 53D, 53E and 53F, are abutting and the adjacent edges of the horizontal sides of juxtaposed angle members 52A to 52F are also abutting so that the six angle members 52A to 52F present a substantially continuous uninterrupted surface at the bottom of the terminal block 22. Each pair of abutting faces 53A–53F of each pair of angle members 52A and 52B, 52C and 52D, 52E and 52F, have opposed grooves 54 and 55 formed in them running substantially vertically from the top to the bottom. There are four such grooves 54 and 55 formed in each of those abutting faces 53A–53F. They are spaced apart along the length of the respective angle members 52A to 52F to the same extent. The outer pair 54 of these four grooves are each about twice as long as each of the inner pair 55 of those grooves. Each opposed pair of grooves 54 and 55 in the abutting faces 53A–53F forms a rectangular section through passage running between the top and the bottom of the abutting vertical faces 53A–53F of the abutting angle members 52A–52F.

Each such a through passage receives a respective busbar 56–58, 61–69 which is a close fit therein. The twelve busbars 56–58, 61–69 depend below the panel 51 spaced one from another, as can be seen in FIG. 11, and each provides a terminal connection to which a respective terminal 49 of the leads 34 from the stator windings 23 is connected. Each of these busbars 56–58, 61–69 also projects above the panel 51.

Each of the angle members 52 is formed from an insulating structural plastics material, such as nylon, by moulding.

The group of three busbars 56–58 that extend through the three left hand larger through passages 54, as seen in FIGS. 11 and 12, each provides a respective one of the three output terminals U, V and W for the three phase supply generated by the three phase AC generator. The three busbars, 61–63, of the other group that extend through the three right hand larger through passages 54, as seen in FIGS. 11 and 12 are bent over at 90° above the panel 51 and are each connected to a common busbar 71 which provides the neutral output terminal of the AC generator.

The two further groups of three separate busbars 64–66 and 67–69 that are provided between the three busbars 56–58 which serve as the three output terminals U, V and W and the other three busbars 61–63 that are connected together to the neutral output terminal 71, are spaced from each other and from those other busbars 56–58, 61–63 so as to be electrically insulated therefrom by the electrically insulating material of the structural panel 51. Each of the busbars 64–69 is located within a respective rectangular through passage which is formed by appropriate ones of the smaller grooves 55 in the abutting faces 53 of the angle members 52. Each of these two groups of three additional busbars 64–66, 67–69 is in line with a respective one of the output terminals U, V and W and the aligned busbar 61–63 that is connected to the neutral output terminal 71. Hence the twelve busbars 56–58, 63–69 are arranged in four columns and in three rows.

In order to connect the terminal block 51 to provide a series star three phase output arrangement, each of the pairs of busbars 64 and 67, 65 and 68, 66 and 69 between a respective one of the three output terminals U, V and W and a respective one of the busbars 61–63 which is connected to the neutral output terminal 71, is connected together by a respective connecting link 72–74. In order to alter the output arrangement from the series star arrangement to a parallel star arrangement, those connecting links 72–74 are removed and replaced by separate connecting links 75 and 76, 77 and 78, 81 and 82 which are shown chain dotted to FIG. 12 and by which each of the busbars 64–69 that is between a power output terminal U, V, W and the respective busbar 61–63 that is connected to the neutral output terminal 71 is itself connected by a respective connecting link 75–78, 81, 82 to the adjacent one of the respective power output terminals U, V, W or the neutral terminal busbar 61–63 as can be seen from FIG. 12. The connecting links 75–78, 81, 82 which connect the busbars together for either a series star output arrangement or a parallel star output arrangement are above the structural panel 51. Hence the connection arrangement can be changed from one to the other by working from above the structural panel 51 and there is no need to provide for access to the connections of the leads 34 to the busbars below the structural panel, which may therefore be permanent.

Hence there is provided a terminal block 22 which supports the electrical connections between the leads 34 and the output terminals U, V, W of the AC generator which is light in weight and which presents a substantially uninterrupted and electrically insulating barrier between the working area above those terminals U, V, W and the area within the casing 21 below the terminal block 22 such that there is a minimal risk of tools or debris being dropped or falling unintentionally into the AC generator during assembly or refurbishing. Also connection of the generator can be altered between series star and parallel star simply by changing over connections above that electrically insulating barrier. Furthermore, the construction of the terminal block 22 whereby it comprises six angle members 52 arranged side by side with upright faces 53 of adjacent angle members 52 abutting one another and adjacent edges of horizontal sides of those angle members 52 abutting one another as well, to form the substantially uninterrupted barrier, leads to the resultant panel 51 being a rigid formation. As a result, any tendency for the busbars 56–58 and 61–69 that are supported by the panel 51 to be deflected one relative to another by electromagnetic forces to which they may be subjected, especially under fault conditions externally imposed on the alternator by the power transmission or distribution system to which it may be connected, and thus to tend to twist the angle members 52 between which they are supported with the possible consequence of short circuitry as adjacent busbars touch one another, is resisted by the angle members themselves.

Although the armature windings 23 described above are perfect lap windings, it is preferable to use perfect concentric windings. FIG. 13 shows armature windings which comprise twelve sets 83.1–83.12 of perfect concentric windings. Each set 83.1–83.12 of perfect concentric windings comprises a single conductor which is bent into four loops, one within another so that the four loops can lie substantially in the same plane, each loop being generally rectangular. The long sides (conductors 36) of each loop of a set of windings 83.1–83.12 are laid in a respective axially-extending slot 84 (see FIG. 14) formed in the inner cylindrical surface of the stator 24 and extend beyond the stator 24 at either end so that the shorter sides of each loop of the stator windings overhang the stator 24 at the respective end. The four long sides 36 of the loops of each set 83.1–83.12 that lead in the clockwise sense, with respect to the other side of that set 83.1–83.12, are laid over the trailing long sides 36 of the next but one set 83.1–83.12 in the clockwise direction. This is so for each and everyone of the twelve sets 83.1–83.12 and is a characterising feature of "perfect" concentric windings. Each winding set 83.1–83.12 has two output leads 34, one being a neutral lead and the other being a positive output lead.

FIG. 14 shows that each stator slot 84 within which one long side 36 of a loop of a "perfect" concentric winding set 83.1–83.12 is laid upon another, is lined by an insulation 85. Also a Nomex shoe 86 is provided between the two loop side conductors 36 laid one on the other in the slot 84. Another such shoe 87 of insulating material, a Nomex polyester mixture, is laid on the one of those conductors 36 that is nearer the mouth of the slot 84. The latter is narrower than the remainder of the slot 84 and an epoxy glass board 88, which is wider than the mouth, closes that mouth so as to retain the shoes 86 and 87 and the conductors 36 within the slot 84.

The right hand end of the stator 24, as seen in FIG. 1, is known as the "Drive End". The overhanging ends of the sets of windings 83.1–83.12 at the "Drive End" comprise the closed ends of all the loops of the twelve sets 83.1–83.12 of windings at the ends of those sets 83.1–83.12 remote from the terminal leads 34 and together comprise a circumferentially-extending annular array of windings 23. This circumferential array is encased in a wide mesh net 89 of lacing cord (as shown in FIG.) and is embraced around its outer surface by an encircling bracing rope 91. The bracing rope 91 comprises an inner core of pre-stressed linear mono-glass filaments within a woven outer sheath formed by braiding and impregnated with a thermosetting resin after assembly to comprise a rigid ring which restrains the winding array against displacement that may otherwise be caused in reaction to electromagnetic forces induced in the overhanging windings at that end of that stator 24 by high fault levels that may occur in a power transmission or distribution system into which the AC generator is installed. The prestressed linear mono-glass filaments encased in the outer sheath of braided polyester fibres is sufficiently flexible prior to impregnation with the insulating resin, for it to be wrapped around the overhanging portions of the windings 23 so that it closely conforms to the irregular shape of that overhanging portion, it being moulded into a rigid ring body having that form after the resin has set.

The other ends of the loops of each set 83.1–83.12, including the leads 34 of each set 83.1–83.12 similarly overhang from the left hand end of the stator 24, as seen in FIGS. 1 and 5. These again are arranged to form a circumferential array of windings at the left hand end of the stator 24 which is known as the "Non Drive End".

The circumferential array of windings 23 at the "Non Drive End" is encased in a wide mesh net of lacing cord and is embraced at its end that is spaced from the stator 24 by a bracing rope 92. The bracing rope 92 is disposed radially inwardly with respect to the cleats 35 because of the presence of the latter. otherwise it is formed in substantially the same manner as has been described above for the bracing rope 91 at the "Drive End".

In operation of the AC generator, the coupling plate 26 is coupled to a fly-wheel of a driving prime mover or engine. For excitation of the AC generator its rotor windings are energised either by a direct current supply which is supplied to those windings via terminals on the rotor 25 through brushes and slip rings or, in the case of a brushless AC generator, by a rectified output of a separate small exciter which is usually mounted on the same shaft as the rotor 25. The latter has a DC stator winding and a 3-phase or single phase winding on its rotor, the output of which is rectified and fed to the windings on the rotor 25. This excitation current, whether it is a separate DC supply or a rectified output of an exciter is a current of lower strength than the output of the AC generator.

The driving prime motor is actuated to rotate the rotor 25 within the stator 24. The output current is generated in the stator windings 23 by mutual induction in the usual way and is led through the leads 34 to the terminals U, V, W of the terminal block.

The fan 27 rotates with the rotor 25, draws air through the stator 24 from the remote end thereof and discharges that air through the discharge passages 32 formed by the volute casing 30. Use of the volute casing 30 improves the cooling by increasing the volume of air that is drawn through the stator 24 by the fan 27 for discharge through the discharge passages 32 formed by the volute casing 30. Furthermore the arrangement of the blades 31 whereby they are oblique to the radial so that they trail the radial, contributes to this arrangement. Moreover, the tapering of the tips of the blades 31 leads to a lower noise output than has been found to be the case where the blades had tips which were substantially parallel to the axis of rotation.

The air that is drawn through the stator 24 by the fan 27 is also drawn into the stator 24 around and through the leads 34 that are led around the six axially spaced circumferentially extending tracks formed by the circumferential array of cleats 35, those leads 34 being supported in free space by the cleats 35 with which they cooperate to form a grid structure as has been described above, the interstices of that grid structure serving as ventilation spaces through which that air is drawn. This enhances the ventilation of those leads 34 and further improves the cooling of the AC generator. There is some improvement in cooling with perfect lap windings, so that the rating of the AC generator would be improved, but the conjoint effect of the arrangement of the leads 34 so they extend around the six axially spaced circumferentially extending tracks with the use of perfect concentric windings gives even better cooling of the windings and hence better voltage and current balance in the windings of the stator 24. This leads as a result to an increase in the power density or rating of the AC generator. The improved cooling that follows from the use of the volute casing 30 with the blades 31 that are oblique to the radial so that they trail the radial as described, together with that, that follows from the conjoint effect of the arrangement of the leads 34 in six axially spaced circumferentially extending tracks and the use of perfect concentric stator windings, leads to an increase of between 15 and 20% in power density.

The arrangement of the terminal block 22 results in the physical support for the metal busbars 56–59, 64–69 which conveniently are formed of a tin plated copper, being provided by the insulating material which is considerably more light weight than the conventional welded structure.

FIGS. 15 and 16 show a modification of the AC generator described above with reference to FIGS. 1 to 14. Parts of the generator shown in FIGS. 15 and 16 which are similar to corresponding parts of the generator shown in FIGS. 1 to 14 are identified by the same reference characters. The generator shown in FIGS. 15 and 16 has "perfect" concentric windings 83 as have been described above with reference to FIGS. 13 and 14.

FIG. 15 shows a circumferential array of six cleats 93 which are mounted on the curved winding portions that comprise the ends of the twelve sets 83.1–83.12 of winding portions that project from the "None Drive End" of the stator 24. FIG. 16 shows that each of those cleats 93 is similar to the cleat 35 that has been described above with reference to and as shown in FIG. 8, except that the back portion 39 of the cleat 93 projects axially beyond the prongs 41 at the end thereof remote from the tongue 44 to form a shoulder 94 with the prong 41 that is furthest from the tongue 44. The shoulders 94 of each of the circumferential array of cleats 93 provide a set for a solid ring 95 of copper (shown chain dotted in FIG. 5) which rests thereon whereby the ring 95 is supported by the circumferential array of cleats 93.

The ring 93 is not a complete circle but extends over about 350°, the spaced ends of the resultant loop being at the top. Each of the neutral leads of the windings 23 is electrically connected to the ring 95 so supported on the annular array of cleats 93. To ensure a good electrical connection, the end of each such neutral lead is bared by removing the enamel coating to expose copper whereby to provide a good copper-copper contact. The ring 95 is retained upon its seat on each cleat 93 by the strap 47 that is passed around it.

Each of the depending portions of the six narrower busbars 64–69 shown in FIG. 11 and each of the load output terminals 56–58 has a respective pair of the positive output leads 34 connected to it. Two neutral connectors 96 and 97 are connected to one of the depending portions of the neutral busbars 61–63 (indeed the neutral busbars 61–63 may be arranged so that only one of them depends below the panel 51). Each of those neutral connectors 96 and 97 is connected to a respective end of the open loop that comprises the solid ring 95.

What is claimed is:

1. A power output terminal arrangement an alternating current machine, comprising an array of structural members and busbars which extend through and which are supported by the array, the busbars having terminals at either end, and being surrounded by an area, the terminals at the ends of the busbars on one side of the array being for connection to terminal leads from stator windings of the alternating current machine and the terminals at the other end of the busbars serving as the external power output and neutral terminals of the alternating current machine wherein the improvement comprises the structural members of the array being formed on an electrically insulating structural material and being in abutment whereby they form a substantially uninterrupted structural panel, each of the busbars which extends through and which is supported by the panel being a close fit within a respective through passage, the through passage being formed by appropriate grooves in abutting faces of the structural members, the arrangement being such that the area that surrounds the busbars is substantially closed by the panel which is close fitted around the busbars.

2. A terminal arrangement according to claim 1, wherein the busbars comprise three power output busbars and, for each of said three power output busbars, a respective neutral and a pair of spaced busbars which are located between the respective power output and neutral busbars from which they are spaced, and linking means operable selectively to connect said pair of spaced busbars together for a series star connection and to connect one busbar of each said pair to an adjacent one of the power output and neutral busbars and to connect the other busbar of each said pair to the other of the power output and neutral busbars for a parallel star connection, said connections by said linking means being made on the side of said structural panel opposite to the ends of the busbars to which stator winding terminal leads are connected.

* * * * *